INVENTORS
TAKEO MIURA
JUNZO IWATA

BY Paul M. Craig, Jr.
ATTORNEY

INVENTORS
TAKEO MIURA
JUNZO IWATA

BY Paul M. Craig, Jr.
ATTORNEY

Prior art FIG. 9
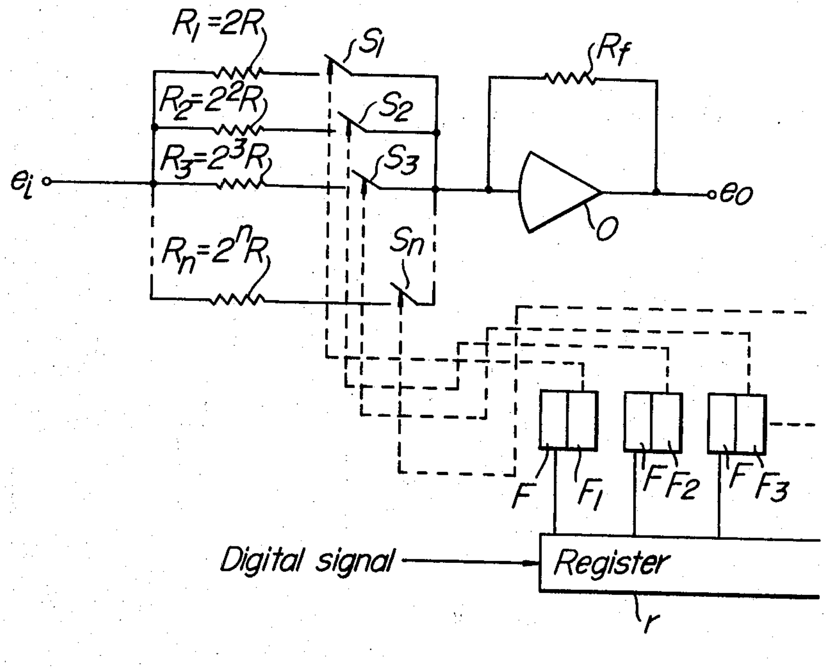
FIG. 11
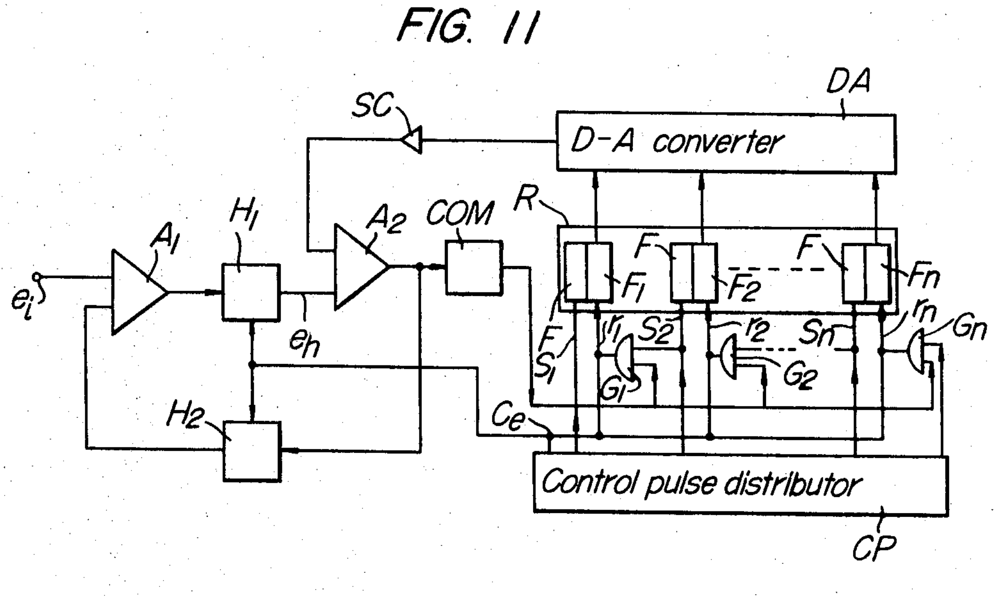
INVENTORS
TAKEO MIURA
JUNZO IWATA
BY Paul M. Craig, Jr.
ATTORNEY

INVENTORS
TAKEO MIURA
JUNZO IWATA

BY Paul M. Craig, Jr.
ATTORNEY

INVENTORS
TAKEO MIURA
JUNZO IWATA

BY Paul M. Craig, Jr.
ATTORNEY

United States Patent Office 3,560,957
Patented Feb. 2, 1971

3,560,957

SIGNAL CONVERSION SYSTEMS WITH STORAGE AND CORRECTION OF QUANTIZATION ERROR

Takeo Miura, Kokubunji-shi, and Junzo Iwata, Kodaira-shi, Japan, assignors to Hitachi, Ltd., and Hitachi Electronics Company, Ltd., both of Tokyo, Japan, both corporations of Japan Filed Jan. 23, 1967, Ser. No. 611,030
Claims priority, application Japan, Jan. 26, 1966, 41/4,050, 41/4,051; Mar. 16, 1966, 41/15,794; May 2, 1966, 41/27,589
Int. Cl. H03k 13/04, 13/17
U.S. Cl. 340—347 6 Claims

ABSTRACT OF THE DISCLOSURE

Digital to analog and sample-hold circuits in which conversion or quantization error generated in each sampling or conversion interval is stored and added to the next consecutive input signal for conversion therewith. The digital to analog converter includes a conventional converter having a capacity of $n$ bits, for conversion of the $n$ most significant bits of an $n+i$ bit input signal. The $i$ unconverted bits are added in a full adder to the next digital input. The sample-hold device includes apparatus for measuring and integrating the difference between the sampled output and the analog input signal during a first sampling interval. The integrated value is then added to the analog input signal during the next sampling interval.

This invention relates to a signal converting system having novel and improved means for relatively easily effecting the correction of quantization errors and sampling errors.

Recently, apparatus including hybrid computers have been increasingly appearing in the field of computer control and like systems so that these apparatus can handle both analog signals and digital signals and exchange informations between such analog and digital signals to effect required arithmetic operations and other operations. Such an apparatus requires the provision of means such as an analog-to-digital converter (A–D converter) or digital-to-analog converter (D–A converter) at the combinating part for the required conversion of signal type. For the conversion between such analog and digital signals, a system has heretofore been employed in the art in which a converter capable of handling signals of about 10 bits is used to enhance the precision of conversion. However due to such a large number of bits, the converting part of the system has necessarily become complex in structure and the system has been uneconomical. This has been especially a great problem for a universal type of converter for which any special precision is not demanded. On the other hand, an attempt to decrease the number of bits to be converted for the economization of the system has resulted in a large quantization error and impossibility of obtaining the required precision.

Many studies have already been made with respect to the quantization error and many methods have been proposed to give successful correction of the quantization error. For example, a method of correction including separately calculating the effect of a quantization error on an answer and deducting the quantization error from the answer was disclosed by J. Vidal, W. J. Karplus and G. Keludjian in a paper entitled "Sensitivity Coefficients for Correction of Quantization Errors in Hybrid Computer Systems," The International Symposium of Sensitivity Analysis, Dubrovnik, Yugoslavia, September 1964. This method, however, has not been practical owing to the complex structure of its computing section. Further, a method in which a noise uniformly distributing within the width of quantization is superposed on a signal before its conversion for thereby linearizing the nonlinear characteristic giving the quantization error was disclosed by G. G. Furmann in a paper entitled "Improving the Quantization of Random Signals by Dithering," The Rand Corporation, RM 3504, May 1963. The Furmann's method contemplates to compensate for the smallness of the number of converted bits by increasing the number of quantizations and has such a merit that the mean value of many converted values approximates the correct value although it has a disadvantage in that the quantization error in each conversion becomes greater. The just-mentioned method is defective in its complex arrangement for producing the required noise.

Besides such quantization error, there is a certain inherent error called a sampling error in a signal converting system. Sampling is intended to refer to a manner of approximation in which signals are sampled at intervals of a particular time from a train of continuous signals so that the sampled signals are utilized to effect approximation to the original train of continuous signals. The sampling error is an error involved in this process of approximation. Heretofore a method of shortening the sampling intervals has generally been adopted in an effort to minimize such sampling error. However the shortening of the sampling intervals means that the mechanical structure necessarily becomes complex when the signal converting system is viewed from the mechanical aspect.

The present invention contemplates the provision of a novel and improved signal converting system which overcomes these prior defects and has means which can compensate for quantization errors and sampling errors.

It is an object of the present invention to provide a sampling system which can operate with minimized quantization errors and sampling errors.

Another object of the present invention is to provide an analog-to-digital converter or digital-to-analog converter whose operating precision would not be lowered in spite of the fact that it is adapted to operate with a reduced number of bits to be converted.

A further object of the present invention is to provide a hybrid computer having the combination of the analog-to-digital converter and the digital-to-analog converter as described above.

The above and other objects, advantages and features of the present invention will become apparent from the following description with reference to the accompanying drawings, in which:

FIG. 1*a* is a schematic representation of the principle on which the present invention is based and FIG. 1*b* is a schematic diagram of the basic structure embodying such principle;

Figure 5:
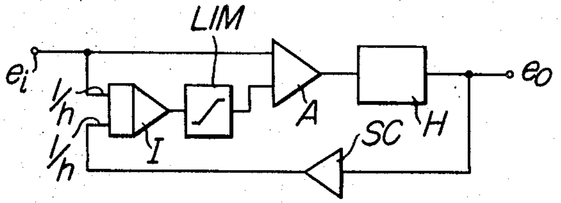
FIG. 5 is a block diagram of another form of the sampling apparatus of the invention which is especially adapted to deal with an input signal accompanying an abrupt fluctuation.
Figure 6B:
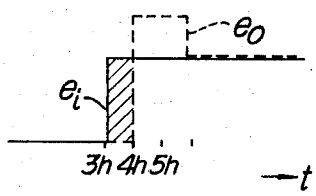
Figure 6A:
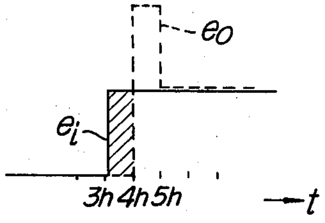
Figure 7:
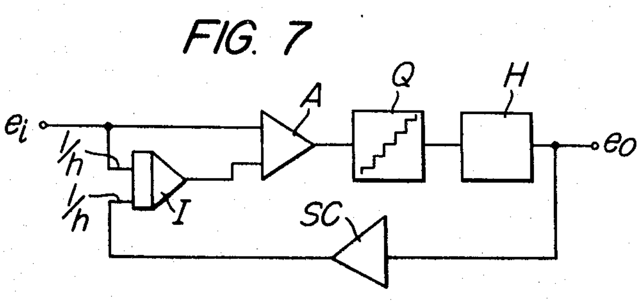
Figure 8:
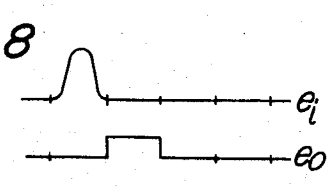
Figure 10:
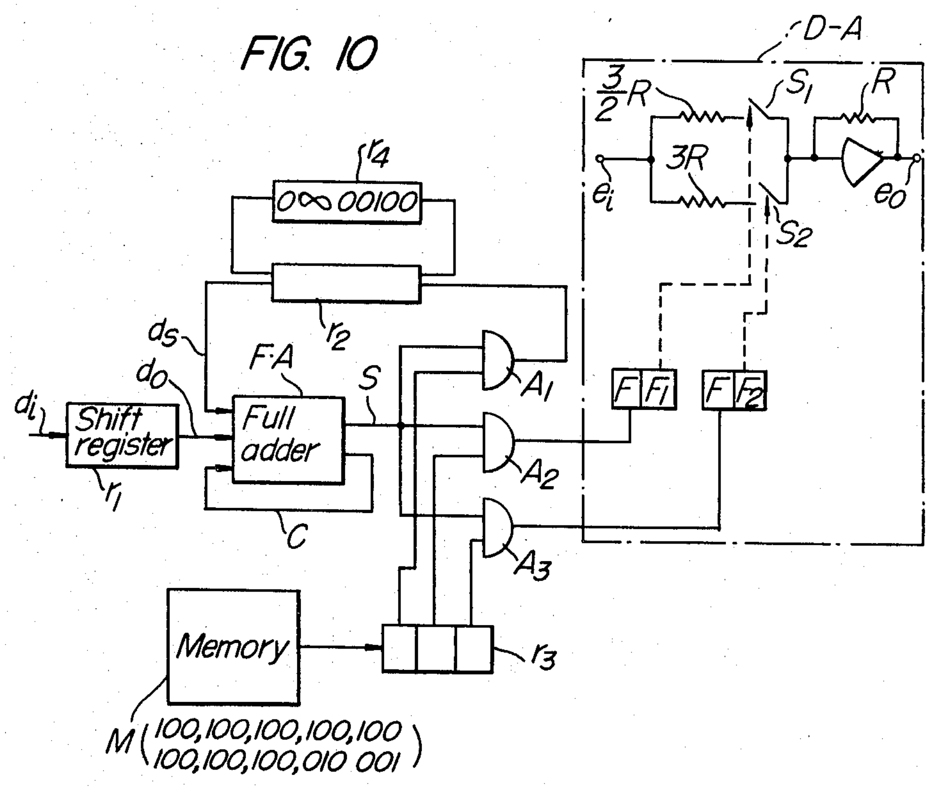
Figure 12:
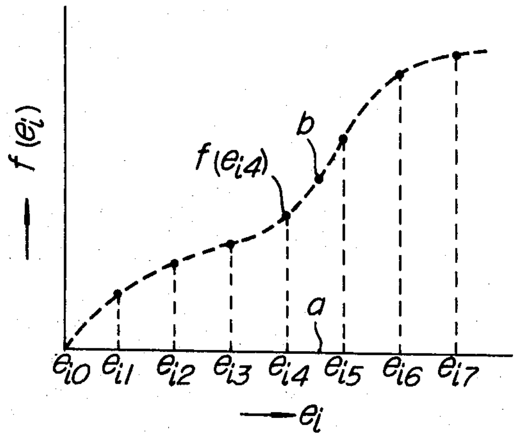
Figure 13:
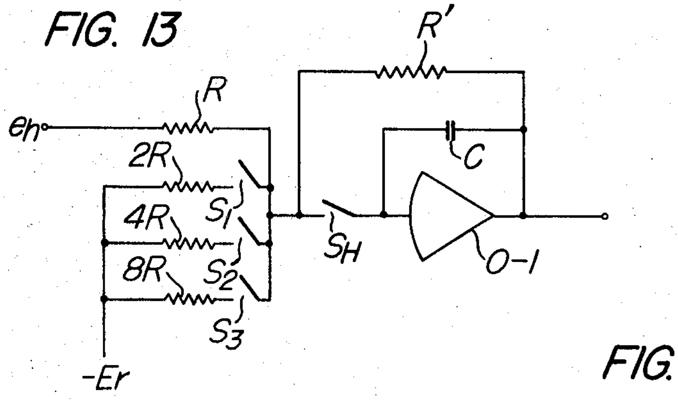
Figure 14:
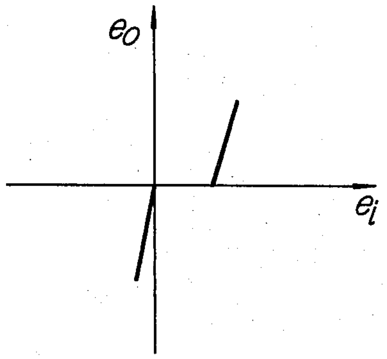
Figure 15:
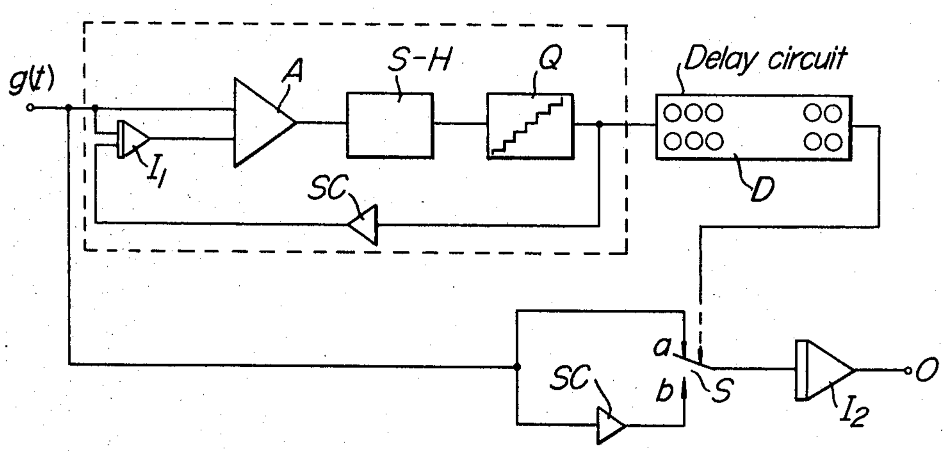

FIGS. 6*a* and 6*b* are graphic illustrations of the manner of operation of the apparatus shown in FIG. 5;

FIG. 7 is a block diagram of a further form of the sampling apparatus according to the invention;

FIG. 8 is a graphic illustration of waveforms for the explanation of the feature of the invention;

FIG. 9 is a schematic diagram of a digital-to-analog converter employed in the prior art;

FIG. 10 is a schematic diagram of a digital-to-analog converter to which the present invention is applied;

FIG. 11 is a schematic diagram of an analog-to-digital converter to which the present invention is applied;

FIG. 12 is a schematic illustration for the explanation of operation of a function generator according to the present invention;

FIG. 13 is a schematic diagram of a modification of the digital-to-analog converter shown in FIG. 11;

FIG. 14 is a graphic illustration of waveform in the digital-to-analog converter shown in FIG. 13; and FIG. 15 is a block diagram of a correlator according to the invention.

It is commonly known that, when a waveform is subject to quantization (or sampling), a difference is produced between the original waveform and the quantized waveform. Such difference is commonly called a quantization error. This quantization error is generated in a signal converting system such, for example, as a sampling apparatus, analog-to-digital converter or digital-to-analog converter. The present invention contemplates the provision of a novel system of signal conversion in which a memory means is provided so that, when a new signal is produced by the quantization of a waveform, the memory means can temporarily store the difference between the produced signal and the original waveform and add the stored value to a signal quantized at the next time of quantization. Thus the present invention attempts to approximate the mean values of the whole signals to the original waveform although there may be relatively large errors at individual times of quantization.

The present invention having such a feature will be described more specifically with reference to the accompanying drawings.

Figure 1A:
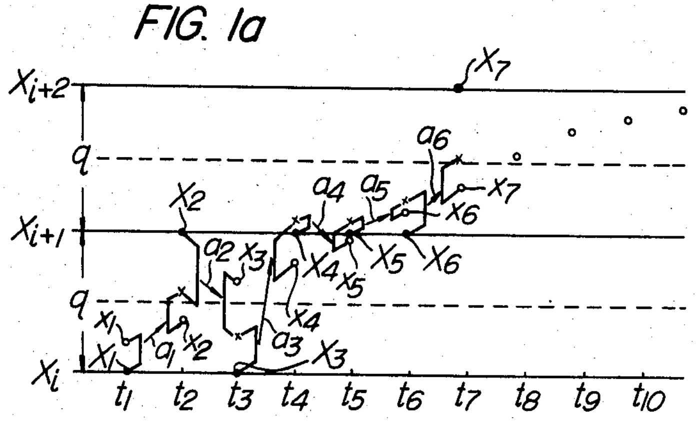
Figure 1B:
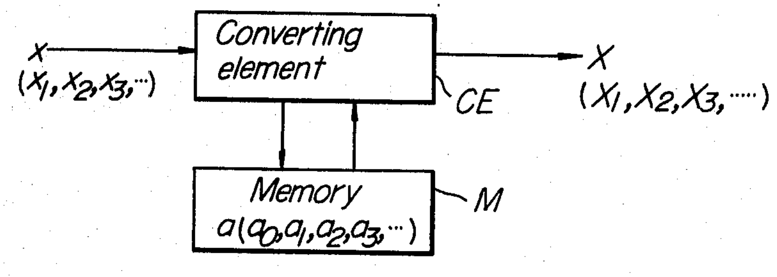

FIG. 1*a* provides the basic principle of the present invention in the form of a schematic illustration of the manner of quantization and FIG. 1*b* is a block diagram of the system for practising the above quantization. Suppose in FIG. 1*a* that $q$ represents the width of quantization and $x_1$, $x_2$, $x_3$ . . . represent input signals. In accordance with the present invention, a quantization error produced in each stage of quantization of an input signal is stored in memory means and such quantization error is added to the next input signal at the time of quantization of the latter signal. More precisely, when an input signal $x_1$ is applied in FIG. 1*a*, this input signal $x_1$ is converted into a quantization level $X_1$ which is nearest to the value of signal $x_1$. Then when a succeeding input signal $x_2$ is applied, a quantization error $a_1$ in the preceding stage of quantization is added to the value of signal $x_2$ to provide a new input signal which is converted into a quantization level $X_2$ which is nearest thereto. In this manner the quantization error in the preceding stage of quantization is added to the next signal to effect a succession of quantizations of input signals. As a result, the following relations can be obtained between the values $a_0$, $a_1$, $a_2$, $a_3$ . . . ($a_0=0$ in the above explanation) stored in the memory means and the quantized values $X_1$, $X_2$, $X_3$ . . . :

$$\begin{aligned} a_0+x_1&=X_1+a_1 \\ a_1+x_2&=X_2+a_2 \\ a_2+x_3&=X_3+a_3 \\ &\text{-------------} \end{aligned} \quad (1)$$

In the above relations, it will be understood that the values $a_0$, $a_1$, $a_2$ . . . are all less than the half of the absolute value of the width of quantization $q$, that is, all these values lie between $-q/2$ and $q/2$. According to this manner of quantization, the difference between individual values of $X_i$ and $x_i$ may also include the quantization error of repeated quantization in the preceding stages and will take some value lying between $-q$ and $q$, thus including a considerably large error. However it will be apparent that when the mean of several values of $X_i$ is compared with the mean of several values of $x_i$, the resulting waveform is very close to the original waveform. That is, the sum of the first $i$ quantizations in the Equations 1 gives $$a_0+\sum_{k=1}^{i} x_k=\sum_{k=1}^{i} X_k+a_i \quad (2)$$

$$\therefore \sum_{k=1}^{i} x_k-\sum_{k=1}^{i} X_k=a_i-a_0 \quad (3)$$

It is to be noted however that $a_i-a_0$ lies somewhere between $-q$ and $q$. Therefore the difference between the mean values lies somewhere between $-q/i$ and $q/i$ and this difference becomes less as the means are taken from a greater number of values.

The prior manner of quantization has been such that individual values of $x_1$, $x_2$, $x_3$ . . . are first taken and are converted into respective values of $X_1$, $X_2$, $X_3$ . . . which lie at the nearest allowable levels. In the prior manner of quantization, however, the quantization error in each quantization lies somewhere between $-q/2$ and $q/2$ and such error component has been discarded in each quantization. Thus the means value derived from such manner of quantization in the prior art has involved a larger error than that in the present invention.

In FIG. 1*b* there is shown a schematic structure of the system according to the invention which includes a converting element CE such, for example, as an analog-to-digital converter or digital-to-analog converter, and memory means M such, for example, as a core memory or integrator. The converting element CE comprises an input section for receiving therein an input signal $x$, a quantization error detecting section for detecting the difference signal $a$ between the input signal $x$ and a value X obtained by quantizing the input signal $x$ and for sending the difference signal $a$ to the memory means M, an adder section for receiving the output signal $a$ from the memory means M to add the output signal $a$ to the input signal $x$, and an output section for delivering the quantized value. The memory means M is operative to detect and store the difference signal coming from the above converting element CE and to send out the above difference signal $a$ to the converting element CE at the time of next quantization. Thus in the system having the above structure, the input signal $x$ is converted (that is, quantized) to the value X by the converting element CE in such a form that the output signal $a$ from the memory means M is added thereto, and at the same time the difference signal between the input signal $x$ and the output signal X is stored in the memory means M. The operation similar to the above is successively repeated to effect the desired conversion.

Various applications of the present invention will be described in detail hereunder.

SAMPLING APPARATUS

In apparatus for handling an analog quantity which varies with time, there are many cases that such analog quantity be subjected to sampling treatment. For example, the analog quantity may be sampled to be converted into a digital signal for the subsequent processing, or multichannel analog signals may be successively scanned by a single common analog means for the required processing.

Figure 2:
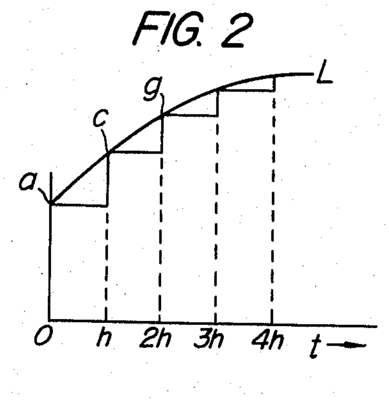
FIG. 2 is a schematic illustration of the sampling operation according to prior practice.

Consider now the prior sampling practice in a case in which an analog quantity varying with time is, for example, sampled at intervals of period $h$ as shown in FIG. 2. According to the prior practice, utilization is not taken of a signal that may arrive between a sampling time and the next sampling time, and a signal arriving at the sampling time is solely utilized. In such a system, therefore, at a time other than the sampling time, a sampled value derived in the past nearest to the specific time is usually employed in lieu of the value at such time. This manner of operation is employed for example in an analog timedivision arithmetic operation in which case a common analog means makes arithmetic operation on a sampled value and the result is held until the next time of sampling. In case the input signal is in the form of a stepwise varying waveform as shown in FIG. 2, this manner of operation remains the same as when the whole signal is used intact without any sampling thereon and the resulting signal waveform is somewhat delayed in time with respect to the original signal waveform. Accordingly, the area of the stepped waveform becomes smaller than that of the original signal when the original signal is increasing with time, while the area of the stepped waveform becomes larger than that of the original signal when the original signal is decreasing with time. Thus the prior sampling process inevitably involves a defect that a relatively large difference exists between the original signal and the sampled waveform.

Figure 3:
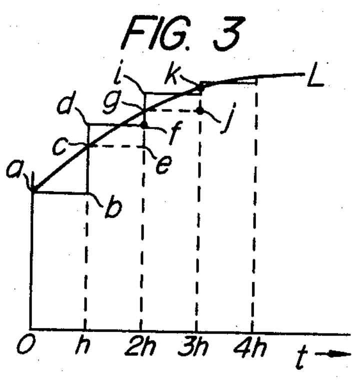
FIG. 3 is a schematic illustration of the sampling operation according to the present invention.

In the present invention, for example, referring more specifically to FIG. 3, the manner of sampling according to the present invention is such that a stepped waveform formed by sampled values is so determined that the area defined between a curve L representing an analog input signal and a reference line, such as *ab*, *df* . . . etc. could be made equal as much as possible to the area defined between the stepped waveform and the reference line, for thereby minimizing the difference between the resulting stepped waveform and the original signal.

Figure 4:
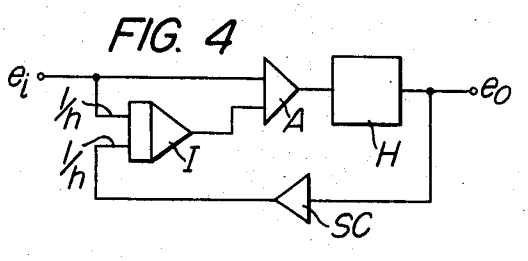
FIG. 4 is a block diagram of a sampling apparatus of the invention adapted to make the sampling operation as shown in FIG. 3.

One embodiment of the sampling apparatus according to the invention will be described with reference to FIG. 4 schematically showing the structure of such apparatus. The sampling apparatus includes an adder A whose input consists of an input signal $e_1$ and an output signal of an integrator I and whose output signal is supplied to a sample-hold circuit H. The output signal from the sample-hold circuit H is fed back through a sign converter SC to provide the input signal to the integrator I. The integrator I is designed to have an input coefficient of the integrator of $1/h$, that is, the output (which is the integral of the difference between the input signal $e_1$ and the output signal $e_0$) increases by C when a constant signal C is admitted therein for a time $h$. The integrator I, adder A, sample-hold circuit H and sign converter SC described above may be those of conventionally commonly known structure and their structure has no relation with the present invention.

Suppose now that the initial value of the integrator I is zero at the beginning of the sampling, that is, at time $t=0$ in FIG. 3. At such time the output of the adder A equals $a$ which is an input signal to the adder A at time $t=0$. This value is sampled by and held in the sample-hold circuit H which therefore continues to deliver this value $a$ until the next sampling time is reached. In the time interval $h$ between these samplings, the integrator I integrates the difference between the sampled value and succeeding input, that is, the difference between *ab* and *ac*. Accordingly the output of the integrator I at the time $t=h$ of the next sampling is $1/h$ of the substantially triangular area *abc*, that is, the mean value of the difference between the input during the two samplings and the value held in the sample-hold circuit H. The sum of this mean value and the analog input constitutes the output of the adder A and this output is sampled by and held in the sample-hold circuit H until the next sampling time is reached. Consequently, the area of the stepped waveform before the next sampling time is the sum of a rectangle *hce*2*h* and a rectangle *dfec*.

It will be seen in FIG. 3 that the area of the rectangle *dfec* is equal to the area of the quasi-triangle *abc* since the height *cd* is equal to the mean height of the quasi-triangle *abc*. At a third sampling time 2$h$, the output of the integrator I is $1/h$ of the difference between the area defined between the curve *acg* and the reference line and the area defined between the stepped waveform *abdf* and the reference line, this difference being equal to the area of a quasi-triangle *ceg*. This output from the integrator I is added to a succeeding input $g$ at the adder A. From the above description it will be understood that in the present invention such a value which can sufficiently correct the difference between a value having been held in the hold circuit and an actual input within the time interval until the succeeding sampling time is reached is added to an analog input and the sum is again held in the hold circuit. Therefore the remainder obtained by subtracting the area defined between the stepped waveform, being the output of the sample-hold circuit H, and the reference line from the area defined between the actual input up to a certain sampling time and the reference line gives always the integral of the difference between the analog input appearing at the preceding time of sampling and the actual analog input appearing after the time of sampling.

It will thus be understood that such difference is represented by the area of quasi-triangle *abc* at time $h$, the area of quasi-triangle *ceg* at time 2$h$, the area of quasi-triangle *gjk* at time 3$h$, etc. and the greater the number of samplings, the smaller the areal difference between the stepped waveform and the actual input. However the embodiment shown in FIG. 4 would show some drawback when operated with an input $e_1$ which might make an abrupt change immediately after the sampling at time 3$h$, for example, as shown in FIG. 6*a*. In such a case a problem arises from the fact that the hatched area is corrected at the next sampling and a value held in the hold circuit will become about twice the next input with the result that a remarkable difference would be developed between the held value and the input waveform.

FIG. 5 shows a schematic structure of another embodiment of the sampling apparatus of the invention which can effectively eliminate the drawback as described above, and the sampling apparatus of FIG. 5 is generally similar to that of FIG. 4 except that a limiter LIM is provided on the output side of the integrator I. The present embodiment is so arranged that, if an abrupt change occurs in the input immediately after the sampling at time 3$h$ as shown in FIG. 6*a*, the output of the integrator I can be limited by the limiter LIM and the difference between the value held in the hold circuit H and the input waveform can be suppressed below a certain value. In the present embodiment, therefore, the correction of the area is not solely effected in the next period but is extended to a plurality of subsequent periods. One example of this manner of correction is shown in FIG. 6*b* in which it will be seen that the limiter LIM is set to limit the abruptly changed value of the half of such value and the correction is effected in the two succeeding periods.

FIG. 7 shows a schematic structure of still another embodiment of the sampling apparatus of the invention which is generally similar to that of FIG. 4 except that a quantizer Q is provided on the output side of the adder A. The quantizer Q may be a circuit of any form so long as it can limit its output to discontinuous finite values. For example, the quantizer Q may deliver an output of zero when its input is a value lying between $-0.1$ and $+0.1$, deliver an output of 0.2 when its input is a value lying between $+0.1$ and $+0.3$, etc. The quantizer Q may, for example, be formed by an analog-to-digital converter or the like operative with a small number of bits. In this case the output is a digital signal representing the quantized value and the input to the sign converter SC is an analog signal equivalent to the digital signal. Digitization of signals is quite convenient for transmission and temporary storage of signals or processing by digital computation.

In the just-described embodiment, the output from the adder A is not arranged to be directly held in the hold circuit H to form the output therefrom and therefore the value held in the hold circuit H will not be such that it can effect correction of the area in the succeeding one period. However the value held in the hold circuit H will be one of the finite output values allowed for the quantizer Q which will minimize the areal difference in the succeeding one period.

The circuit elements employed in the above-described embodiments of the invention may be those commonly conventionally known in the art which may be suitably modified or simplified. For example, the addition and holding may be simultaneously effected in a single circuit in lieu of the provision of separate circuits for individual execution of the addition and holding, or these circuits may be suitably disposed to dispense with the provision of the sign converter SC by making use of the fact that the sign of the signal is reversed in case of the holding with respect to the case of the addition. Further, depending on the performance requested for a specific apparatus, the integrator I employing an operational amplifier may be replaced by an integrating circuit employing a capacitor or an integrating circuit of the above kind further including therein a buffer amplifier.

Still further, the hold circuit may take the form of a primary hold circuit, in which case the primary hold circuit may be arranged to deliver such a value which will correct any difference between the waveform provided by the primary hold circuit and the true input waveform until the time of next sampling is reached. By so doing, the value held therein is more approximated to the true information. This advantage is derivable from the fact that in the present invention every input arriving between the sampling times is fully utilized whereas in the prior practice all such inputs are discarded. This is readily apparent from comparison between FIGS. 2 and 3 in which it will be seen that the waveform in FIG. 3 is closer in its mean value to the true value than the waveform in FIG. 2.

The present invention is further advantageous over the prior art apparatus when used with an input signal $e_i$ of the kind as shown in FIG. 8 which makes a variation during one sampling time and the next. In the prior apparatus in which the sampled signal is solely hold, such variation in the signal would not entirely appear. In the present invention, however, such variation in the signal appears in the hold circuit as shown by $e_0$ in FIG. 8 although with a some time lag and thus its mean value can be made very close to the mean value of the input.

The present invention as described above has a remarkable feature that the mean value held in the apparatus is very close to the mean value of an input even when an analog-to-digital converter operative with a small number of bits is incorporated therein as shown in FIG. 7 in which case a value held therein is quantized by the converter and thus is different from the input to the hold device.

DIGITAL-TO-ANALOG CONVERTER

Digital signals are converted into analog signals by means of a digital-to-analog converter. This digital-to-analog converter generally operates in a manner that connections through resistors proportional in value to the respective weights of digits of a digital signal are turned on-off depending on "1" or "0" of the digital signal. One typical example of the prior digital-to-analog converters is shown in FIG. 9 and is adapted to effect conversion of an $n$-bit digital signal. The prior digital-to-analog converter in FIG. 9 comprises a register $r$ for temporarily storing a digital signal; flip-flops $FF_1$, $FF_2$ . . . $FF_n$ for receiving the signal from the register $r$, storing the respective bits of the signal and actuating a set of switches $S_1$, $S_2$ . . . $S_n$; resistors $R_1$, $R_2$ . . . $R_n$ connected in series with the respective switches $S_1$, $S_2$ . . . $S_n$ in which a resistor $R_i=2^iR$ is provided to deal with an $i$-th bit of the $n$-bit digital signal and represents the so-called weight; an operating amplifier O; and a feed-back resistor $R_f$. With the above circuit structure, suppose now the first bit of the digital signal represents a numeral 1/2, the second bit a numeral $1/2^2$, etc. Then by turning on-off the respective switches depending on "1" or "0" of the respective bits of the digital signal, the ratio of output $e_0$ to input $e_i$ is derived as a value representing the digital signal, thus effecting the desired digital-to-analog conversion. In the prior converter having a structure as described above, the switch-holding flip-flops, input resistors and switches must be provided in the number corresponding to the number of bits to be converted and since the input resistors must be especially precise, the structure of the converter becomes very complex as a matter of fact. Further in order to enhance the precision of conversion, the number of bits to be converted must be increased which leads to a more complex structure of the apparatus.

The digital-to-analog converter according to the present invention intends to attain the substantially same degree of precision as with the prior converter operative with a large number of bits, and one preferred embodiment of the invention is illustrated in FIG. 10. Portions surrounded by dotted lines in FIG. 10 represent a digital-to-analog converter section similar to those generally seen in conventional digital-to-analog converters. The remainder of the apparatus comprises means for effecting approximation of 2 bits of an $n$-bit, say, 10-bit input digital signal and means operative to add a difference signal produced by the above approximation in the next conversion step.

The digital-to-analog converter according to the invention will now be described in detail with reference to FIG. 10. The digital-to-analog converter includes a shift register $r_1$ which stores a digital input signal $d_i$ and shifts such signal, a shift register $r_2$ which stores an output signal from an and gate $A_1$ and shifts such signal, and a shift register $r_3$ which stores information stored in a memory means M and controls the operation of and gates $A_1$, $A_2$ and $A_3$ for respective bits of the signal. The digital-to-analog converter further includes a full adder F·A which receives its input from the shift registers $r_1$ and $r_2$ and from its own carry output terminal. The summed-up signal in the full adder F·A is delivered therefrom as an output signal S which is used in conjunction with the output signal from the shift register $r_3$ to control the operation of and gates $A_1$, $A_2$ and $A_3$. With the arrangement as described above, it is possible to determine the contents of the shift registers $r_2$ and $r_3$ when the number of bits of the input digital signal and the number of bits to be converted by the digital-to-analog converter section within the dotted lines are determined. In other words, the fact that the number of converted bits is 2 bits means that the digital input signal should be approximated depending on what is represented by the most and next significant 2 bits. Suppose now that the digital input signal consists of $n$ bits, then the operation may be a repetition of the steps including storing the less significant $(n-2)$ bits, adding the stored value to the next digital input signal when such signal appears, supplying the most and next significant 2 bits in the result to the digital-to-analog converter section within the dotted lines, and again storing the remaining $(n-2)$ bits in the result. Therefore the content of the shift register $r_3$ for controlling the and gates $A_1$, $A_2$ and $A_3$, or more specifically the content of the memory means M for supplying the stored information to the shift register $r_3$ may be such that the digital input signal is transmitted to the digital-to-analog converter section within the dotted lines when the digital signal of the most and next significant 2 bits arrives and the digital input signal is transmitted to the shift register $r_2$ when the digital signal of the less significant $(n-2)$ bits arrives. That is to say, arrangement may be such that the and gates $A_2$ and $A_3$ are controlled in case of the most and next significant 2 bits and the and gate $A_1$ is controlled in case of the less significant $(n-2)$ bits. Accordingly, the information stored in the memory means M is 001 and 010 for the most and next significant 2 bits, respectively, and 100 for each of the less significant $(n-2)$ bits.

In the arrangement according to the present invention as described above, a digital input signal is transmitted from the shift register $r_1$ to the full adder F·A, and thence, the digital signal of less significant $(n-2)$ bits given to the output signal from the full adder F·A is transmitted through the and gate $A_1$ to be stored in the register $r_2$, while the digital signal of the most and next significant 2 bits is transmitted through the and gates $A_2$ and $A_3$ and the flip-flops $FF_1$ and $FF_2$ to parallel switches $S_1$ and $S_2$ to control the same, thus being subjected to digital-to-analog conversion. Then when a new digital input signal is applied, the output signals $d_0$ and $d_s$ of the respective shift registers $r_1$ and $r_2$ are applied to the full adder F·A, and if the sum is 10, the carry signal $c$ in state 1 is fed back to the full adder F·A to add 1 to the bit in the next place, while if the sum is 00 or 01, there is no carry and $d_0$ and $d_s$ are merely summed up. Simultaneously with such carry operation (meaning that the signal is fed back irrespective of "1" or "0"), the least significant bit produced by the signal addition is transmitted through the and gate $A_1$ to the register $r_2$ to be stored therein. By the repetition of the operation as described above, the approximated portion and the difference portion of the digital input signal are fed out to the digital-to-analog converter section within the dotted lines and the shift register $r_2$, respectively.

The above arrangement, however, is still defective in that a relatively large error is developed between an approximated signal and the original signal. More precisely, in deriving approximated levels from signals 00, 01, 10 and 11, it is inevitable with the above arrangement that values 00, 01, 10 and 11 are always derived from digital input signals lying between 00 and 01, 01 and 10, 10 and 11, and above 11, respectively. Where therefore conversion with less error is demanded, arrangement must be such that conversion is effected at smaller level intervals than the above case. To this end, arrangement may be made so that every values lying between 00 and 01 should not be made 00 but a value smaller than the intermediate value be made 00 and a value larger than the intermediate value be made 01, whereby to enhance the precision of conversion. The above principle should also apply to every values lying between 01 and 10, 10 and 11, and above 11.

Such basic principle is embodied as a portion affixed to the shift register $r_2$ in FIG. 10. As shown in FIG. 10 a new register $r_4$ is provided on the input side of the shift register $r_2$ and the content of this specific register $r_4$ is so selected to have a special value in which the third significant bit is made "1" with all other remaining bits made "0." The content of memory as described above is transferred to the shift register $r_2$ before the actual conversion takes place, and this value is added in the form of the output signal $d_s$ to the full adder F·A during the first conversion. By so doing, "1" is added to the third significant bit of the digital input signal with the result that the digital input signal itself is subjected to level shift. Such level shift can be effected because of the fact that respective values of 00, 01, 10 and 11 can be represented by 000, 010, 100 and 110 when expressed in terms of 3-bit signals and respective intermediate values therebetween are 001, 011, 101 and 111. In other words, addition of "1" to the third significant bit of a digital signal means that the entire digital signal is displaced by half bits. Suppose now that a digital input signal lies between 01 and 10 and has a value closer to 01 than the intermediate value of 01 and 10, then addition of "1" to the third significant bit results in a value which is still less than 10 and the conversion is effected on a value 01. On the other hand, addition of "1" to the third significant bit in case of a value closer to 10 results in a value which is larger than 10 and lies somewhere between 10 and 11. This value, however, is closer to 10 and the conversion is effected on a value 10. Thus automatic selection of a higher or lower level can be attained depending on whether the value of a digital input signal is closer to one of two levels. It is to be understood however that the transfer of information from the register $r_4$ to the shift register $r_2$ may solely be made at the immediate beginning of the conversion and any further signal transfer is utterly unnecessary in the subsequent operation.

In the above arrangement a new register $r_4$ is provided in order to establish a special information in the shift register $r_2$, but it will be understood that any means may be provided in lieu of the register $r_4$ so long as such means can provide an information whose third significant bit is "1" and other bits are "0." It will further be understood that the number of converted bits is in no way limited to 2 bits. Generally, when conversion of $i$ bits is desired, $(i+1)$ and gates and $i$ flip-flops should be provided and digital signals of $(i+1)$ bits should be set in the memory means M.

Description will next be directed ta the digital-to-analog converter section surrounded by the dotted lines. Input resistances are selected, for example, at 3/2R and 3R with respect to resistance R of a feed-back resistor to give four digital-to-analog conversion levels of 0, 1/3, 2/3 and 1. The respective levels correspond to 00, 01, 10 and 11 when considered in terms of digital signals. In other words, the digital signals are quantized by the above conversion. Therefore, when "1" is not added to the third significant bit, output values are 0, 1/3, 2/3 and 1 for respective levels between 0 and 1/3, 1/3 and 2/3, 2/3 and 1, and above 1. When, on the other hand, "1" is added to the third significant bit, output values are 0, 1/3, 2/3 and 1 for respective levels between 0 and 1/6, 1/6 and 1/2, 1/2 and 5/6, and 5/6 and 7/6. By virtue of the above relation, the time-based mean of the results of digital-to-analog conversion becomes very close to the mean of the input digital signals.

The latter case of higher precision will be considered more specifically supposing that $D_1$, $D_2$, $D_3$ . . . are digital signals and $A_1$, $A_2$, $A_3$ . . . represent analog signals derived as outputs by the quantization of the digital signals. Then, $$\sum_{i=1}^{n} D_i$$

equals what is obtained by adding to $$\sum_{i=1}^{n} A_i$$

a value remaining in the shift register $r_2$ after the $n$-th operation, and since the value in the shift register $r_2$ is smaller than the width of quantization, the difference between the mean values of these two signals becomes smaller than $1/n$ of the width of quantization. Where there are many channels for digital-to-analog conversion, inexpensive elements such, for example, as magnetic core elements may be employed in lieu of the shift register, and common arithmetic operation means may be provided to make addition of digital quantities, subtraction of quantized values, write-in of the balance on the shift register $r_2$ and other operations so that the arithmetic operation means can successively scan the channels to effect the desired conversion.

ANALOG-TO-DIGITAL CONVERTER

Conventional analog-to-digital converters have had a defect similar to that encountered with conventional digital-to-analog converters in that the structure thereof becomes complex with the increase in the number of converted bits, while they can not completely utilize the information carried by analog signals at a smaller number of converted bits.

The present invention provides an analog-to-digital converter operative with a small number of bits with which the information carried by analog signals can be utilized as a whole.

A preferred embodiment of the analog-to-digital converter according to the present invention will be described in detail with reference to FIG. 11. The analog-to-digital converter includes adders $A_1$ and $A_2$; sample-hold circuits $H_1$ and $H_2$, a comparator COM operative to compare the positive or negative of an input signal from the adder $A_2$ with respect to a reference level and to deliver 0 or 1 depending on the positive or negative of such signal; a register R consisting of flip-flop $FF_1, FF_2 \ldots FF_n$ for storing a digital signal subjected to digital-to-analog conversion; gates $G_1, G_2 \ldots G_n$ for controlling the respective flip-flops of the register R; a control pulse distributor CP which distributes control pulses for the control of sampling intervals of the gates $G_1, G_2 \ldots G_n$, the flip-flops $FF_1, FF_2 \ldots FF_n$ and the sample-hold circuits $H_1$ and $H_2$; and a digital-to-analog converter section DA operative to convert the digital signal from the register R into an analog signal and to supply such analog signal through a sign converter SC to the adder $A_2$. An analog-to-digital converter commonly called the sequence comparating system has been known conventionally and comprises such comparator, control pulse distributor, register and digital-to-analog converter. The operation of this analog-to-digital converter is based on the principle that an accurate voltage corresponding to a digital quantity is generated and compared with an input voltage for thereby determining digital quantities in successively higher places. The analog-to-digital converter according to the invention is improved over such priorly known analog-to-digital converter in that it has a smaller number of flip-flops in the register and it has additional provision of sample-hold circuits $H_1$ and $H_2$ and an adder $A_1$.

At first, the flip-flop $FF_1$ corresponding to the most significant place is solely driven to be set at "1" by a set pulse $s_1$ from the control pulse distributor CP. Upon receiving the signal "1," the digital-to-analog converter DA generates a reference voltage which corresponds to the weight of that place. The reference voltage thus produced is subjected to sign conversion by the sign converter SC to be then added to the adder $A_2$. If the above reference voltage is lower than an analog input voltage, there is no output signal from the comparator COM, that is, "0" is delivered from the comparator COM, while if the reference voltage is higher than the analog input voltage, an output signal "1" is delivered from the comparator COM. When therefore the input voltage is lower than the reference voltage, a set signal $s_2$ opens the gate $G_1$ and a reset pulse $r_1$ is generated. The reset pulse $r_1$ acts to reset the flip-flop $FF_1$ at "0." In case the input is higher than the reference voltage, no reset pulse is generated and the flip-flop $FF_1$ remains in its set state with the digital-to-analog converter continuously delivering the corresponding reference voltage. Then the set pulse $s_2$ acts to set the flip-flop $FF_2$ and the half voltage of the voltage corresponding to the flip-flop $FF_1$ appears at the output of the digital-to-analog converter DA for the second step comparison. (However such half voltage will be added to the original reference voltage if the $FF_1$ remains in its set state.) In this manner the contents of the flip-flops in the register R are successively determined by being controlled by the comparator outputs until all the places including the least significant place determined depending on the number of flip-flops in the register R are dealt with to complete the analog-to-digital conversion. The results are obtained in the register R.

The digital quantity stored in the register R is subjected to digital-to-analog conversion to be then fed into the adder $A_2$. After the output has been delivered from the register R (to some other register or arithmetic unit), a clear pulse $c_e$ resets the flip-flops to "0." The clear pulse $c_e$ also designates the time of beginning of sampling in the sample-hold circuits $H_1$ and $H_2$. Therefore the difference signal between the preceding analog input signal $e_h$ and the analog signal obtained by the digital-to-analog conversion of the digital signal subjected to the analog-to-digital conversion is applied to the sample-hold circuit $H_2$ and the sample-hold is done as soon as the clear pulse $c$ appears. Thus the preceding difference signal and the succeeding analog input signal are applied to the adder $A_1$. The sample-hold circuit $H_1$ has started its operation in simultaneous relation with the sample-hold circuit $H_2$ by being driven by the clear pulse $c_e$, and the input signal from the adder $A_1$ is under sample-hold in its input form in the sample-hold circuit $H_1$. The recurrence frequency of the clear pulses $c_e$ determining the sampling time interval and the holding period is determined by the time during which an analog input signal is completely converted into a digital signal with a number of bits dependent on the number of flip-flops in the register R. Accordingly, the summed-up signal derived by adding an analog signal to an error signal in the preceding stage is again compared with an analog signal produced by the digital-to-analog converter DA in response to the set pulse $s_1$, and the operation as described above is repeated thereafter.

Suppose now that the number of converted bits is 3. In the conversion of 3 bits, a digital quantity can only take eight values and thus there are relatively large differences between the analog values corresponding to such values of the digital quantity and analog values to be subject to analog-to-digital conversion, these differences constituting the output from the adder $A_2$. The output from the adder $A_2$ is sampled by and held in the sample-hold circuit $H_2$. In the next step, this value held in the hold circuit $H_2$ and an input $e_i$ are summed up in the adder $A_1$ and the summed-up value is sampled by and held in the sample-hold circuit $H_1$ for the analog-to-digital conversion. In this manner, the difference between an analog quantity to be converted and a digital quantity having been subjected to conversion is held and this difference is added to the next input each time the analog-to-digital conversion is done. Therefore the mean of the values obtained by the analog-to-digital conversion approaches the mean of the values of input $e_i$ during sampling. This is true because the difference between the total of $n$ sampled values of input $e_i$ and the total of $n$ analog-to-digital conversion values is less than one quantization level irrespective of how many the number of $n$ may be and the mean difference is always less than $1/n$ of one quantization level.

Since the mean of values subjected to the analog-to-digital conversion is thus substantially equal to the mean of inputs, analog information can be admitted into digital apparatus in spite of the small number of bits of digital signals by arranging in a manner that the number of conversions is sufficiently large compared with the rate of variation of input $e_i$. When, for example, a function $f(e_i)$ is computed by a digital computer, a digital quantity has only eight levels provided that the number of bits involved in analog-to-digital conversion is 3. In this case, the digital quantity has eight values $e_{i0}$ to $e_{i7}$ as shown in FIG. 12 and an analog quantity $e_i$ is converted into one of these eight values by the analog-to-digital conversion. These eight values $e_{i0}, e_{i1} \ldots e_{i7}$ are spaced from each other by one quantization level. Suppose now that a constant analog input $e_i$ appears as shown at point $a$ in FIG. 12 and this point $a$ is greater than $e_{i4}$ by one-third of one quantization level. Then according to the prior conversion system, this value is always analog-to-digital converted to the value of $e_{i4}$ which is closest to $a$ and the resultant digitized function is represented by $f(e_{i4})$. In contrast thereto, according to the present invention, this value is converted to $e_{i4}$ in two-thirds of a multiplicity of analog-to-digital conversions and is converted to $e_{i5}$ in the remaining one-third of such conversions, with the result that the mean of these values is always given by $a$. Therefore the function calculated therefrom is given by the form of $f(e_{i4})$ in two cases out of every three and by the form $f(e_{i5})$ in the remaining one case. Thus the mean of these function values, that is, point $b$ is obtained as a value which is closer to $f(e_{i5})$ than $f(e_{i4})$ by one-third of the difference between $f(e_{i4})$ and $f(e_{i5})$.

It will be understood from the above that the mean of values of digital computation is obtained as a value of linear interpolation of function values. This means that, in case of a function to be computed in the digital computation section takes a non-linear form, an accurate result of arithmetic operation can be sufficiently obtained provided that the quantization level is such as to give a value of linear interpolation having a sufficient degree of approximation, and in case a linear operation is to be made in the digital computation section, an accurate result of arithmetic operation can be obtained consistent with a high speed of conversion even though the quantization level is roughly pitched and might be one bit in an extreme case. Some examples of linear operation include a case of employing a dead time element for the storage of a digital quantity which is then taken out after a predetermined time and is subjected to digital-to-analog conversion to give an output, a case of making various operations in order to obtain a statistic, and a case of transferring data in the form of digital quantity in order to eliminate the effect of noises thereon.

Where the speed of conversion is very rapid, several data derived by the past analog-to-digital conversion may be averaged before making the digital operation and the mean values so derived may be employed to make the digital operation. It is possible to accurately perform a non-linear operation by the above manner of operation. In this case, however, the sole advantage is the reduction in the number of bits in the analog-to-digital converter and the advantage of reducing the number of bits in the digital computation section is lost. (Digital operation becomes simpler with a less number of bits subjected to analog-to-digital conversion when no mean is taken in the digital computation section.)

Part of the structure of the analog-to-digital converter of the invention as shown in FIG. 11 may be modified as shown in FIG. 13. More precisely, FIG. 13 represents an example in which the analog voltage divider, adder $A_2$ and sample-hold circuit $H_2$ in FIG. 11 are assembled together as a single unit. In FIG. 13 it will be seen that, in lieu of independent provision of the voltage divider, input resistors 2R, 4R and 8R of the adder are connected throguh respective switches $S_1$, $S_2$ and $S_3$ to the input of an operation amplifier 0–1 so as to obtain eight kinds of analog quantity inputs depending on the on-off state of the switches $S_1$, $S_2$ and $S_3$. By selecting a capacitor C and a ressitor R′ so that they give a small time constant, the sum of inputs appears at the output of the amplifier 0–1 when a hold switch $S_H$ is on, but the circiut acts as a hold circuit when the hold switch $S_H$ is off. Also since the comparator COM and the hold circuit $H_2$, for example, are not required simultaneously, the feed-back resistor R′ and the capacitor C associated with the operating amplifier 0–1 may be eliminated and an element such, for example, as a diode having the characteristic as shown in FIG. 14 may be used to form a feed-back means so that it can also act as a comparator. Further, the analog-to-digital converter is in no way limited to the feed-back type as shown in FIG. 11 and may take any other suitable form. For example, since the number of bits may be small, an analog-to-digital converter including a plurality of parallelly arranged comparators may be employed to increase the speed of conversion. Further when it is desired to successively convert a multiplicity of analog quantities into digital quantities, the hold circuit $H_2$ for holding the difference between the value subjected to analog-to-digital conversion in the preceding stage and a value to be newly subjected to analog-to-digital conversion may be provided in the number corresponding to the number of channels and other circuits may be used in common.

From the foregoing description it will be appreciated that the present invention provides an analog-to-digital converter of great practical effect which is operative with a small number of bits and yet can fully utilize the information carried by analog signals.

HYBRID COMPUTER

A hybrid computer consists of the combination of an analog computer and a digital computer and is adapted to make arithmetic operation while exchanging the information between these computers. This hybrid computer requires the provision of a linkage including a digital-to-analog converter, an analog-to-digtal converter, a scanner and a distributor. The hybrid computer makes the arithmetic operation in a manner as described below. In the hybrid computer, the respective operating regions of the analog computer and the digital computer are preliminarily established. Analog signals computed by the analog computer are transferred to the input of the digital computer through the scanner and the analog-to-digital converter. Digital signals obtained by the analog-to-digital conversion are computed in the digital computer. Consequently, the output signals are printed or transferred to the analog converter through the digital-to-analog converter and the distributor. The operation similar to the above is repeated thereafter.

The hybrid computer as described above has a very complex structure. In the first place, the hybrid computer requires two computers therein. Secondly, converters of complex structure are required at the linkage. Thirdly, the operating speed of the hybrid computer is restricted by the above two points. It is therefore very important to simplify the structure of such computer while maintaining its high precision of operation.

The present invention provides a hybrid computer having a linkage of simplified structure by virtue of the provision therein of the novel analog-to-digital converter and digital-to-analog converter as described previously. The present invention will be described firstly with regard to a case in which both the analog-to-digital converter and digital-to-analog converter are those disclosed by the invention. In this specific case, the digital computer is used as an accessory element of the analog computer. In other words, the digital computer need not be a universal apparatus to which the name of digital computer is generally affixed. Although a digital computer is slower in its speed of operation than an analog computer, the fact that the digital computer operates with a small number of bits renders its operation very simplified. This is the reason why a universal digital computer is not required at the digital computation section for making the digital operation. In the invention, the digital computation section may solely comprise such an element which can make an operation which is difficult for computation by the analog computer or an action which is difficult to occur in the analog computer. For example, a multiplying element or dead time element is typical of such element.

The present invention will be described secondly with regard to a case in which an analog-to-digital converter of prior structure is combined with the digital-to-analog converter of the invention as described previously. In such a linkage structure, the number of bits converted by the analog-to-digital converter is the same as in the prior case and therefore the digital computation section may be composed of a universal digital computer. However, the speed of computation of the digital computer is slow compared with that of the analog computer as described previously. Accordingly, the speed of conversion can be increased by employment of a digital-to-analog converter operative with a small number of bits, and as a result, the speed of operation of the digital computer can be substantially increased.

A very important fact in both the above cases is that there is no necessity of provision of special means for averaging the outputs of the digital-to-analog converter for thereby minimizing the errors. In other words, the analog computer includes therein an integrator, and by bringing this integrator at the input end, it is possible to average the output signals from the digital-to-analog converter.

OTHER APPLICATIONS

The digital-to-analog converter according to the invention may be used as a multiplier. That is, the input signal $e_i$ in FIG. 10 may only be supplied in the form of a multiplying signal.

The present invention is also applicable to a correlator. A correlating function represents the degree of effect of a waveform at time $t$ on a waveform at a certain future time $(t+\tau)$, thus showing the correlation between the regularity and non-regulatarity of a signal waveform. This correlating function is expressed in two forms, that is, an auto-correlation function representing the correlation between a waveform $g(t)$ and a waveform $g(t+\tau)$ which is displaced by a time $\tau$ from the waveform $g(t)$, and a cross-correlation function representing the correlation between a waveform $g_1(t)$ and $g_2(t+\tau)$ which is displaced by a time $\tau$ from a waveform $g_2(t)$ which is different from the waveform $g_1(t)$. The auto-correlation function and cross-correlation function can be given, respectively, by the following formulas:

$$\phi(\tau)=\lim_{T\to\infty}\frac{1}{2T}\int_{-T}^{T}g(t)\cdot g(t+\tau)dt$$

$$\phi_{12}(\tau)=\lim_{T\to\infty}\frac{1}{2T}\int_{-T}^{T}g_1(t)\cdot g_2(t+\tau)dt$$

An embodiment of a correlator for obtaining such function will be described with reference to FIG. 15. FIG. 15 gives a schematic structure of a correlator for obtaining an auto-correlation function. In the arrangement shown, the portion surrounded by dotted lines corresponds to the circuit which is operative to effect the correction of quantization errors as described previously. The correlator further includes a delay circuit D such, for example, as flip-flops connected to the output of the above circuit so as to give a delay of time $\tau$, and a switch S controlled by an output signal from the delay circuit D. As shown in FIG. 15, the switch S has two contact positions $a$ and $b$ so that the switch S is urged to its $b$ contact position when $g(t)$ lies in the negative region and the switch S is urged to its $a$ contact position when $g(t)$ lies in the positive region. A symbol SC shown therein designates a sign converter. Thus an integral $$\int g(t)\cdot g(t+\tau)$$

is obtained at an integrator $I_2$, and by arbitrarily varying the delay $\tau$ by the delay circuit D, an output signal $0(\tau)$ whose variable is $\tau$ can be obtained at the output. For the reasons as stated previously, the correlator having such an arrangement can minimize the sampling error and give a correlating function with a considerable accuracy.

What is claimed is:

1. A sample-hold apparatus comprising: a sample-hold circuit; an integrator to which an input analog signal to be sampled and held and an output signal of said sample-hold circuit are applied as its inputs, the input coefficient of said integrator being set at a fraction of a sample-hold period; and adder means having one input connected to the output of said integrator and another input receiving said input analog signal for summing an output signal of said integrator and said input analog signal, the output of said adder means being applied to the input of said sample-hold circuit.

2. A sample-hold apparatus according to claim 1, further comprising a limiter connected between the output of said integrator and said one input of said adder.

3. A sample-hold apparatus according to claim 1, further comprising a quantizer connected between the output of said adder and the input of said sample-hold circuit.

4. A digital-to-analog converter comprising: a first register for temporarily storing an input digital signal of $n$ bits to be converted in a converting cycle during which a digital signal of $i$ bits is converted to an analog signal, $i$ being less than $n$; digital-to-analog converter means capable of converting a digital signal of $i$ bits into an analog signal; a second register for temporarily storing a digital signal of $(n-i)$ bits; adder means for summing a digital signal stored in said second register and least significant $(n-i)$ bits of an output signal stored in said first register; means for deriving an output signal of said adder means and delivering the most significant $i$ bits of said output signal from the adder means and least significant $(n-i)$ bits thereof to said signal-to-analog converter means and said second register, respectively, contents to be added to said input digital signal from said second register being formed of a digital signal of least significant $(n-i)$ bits at the previous converting cycle.

5. A digital-to-analog converter according to claim 4, further comprising another adder means for adding "1" to the $(i+1)$ bit position of said input digital signal upon starting a converting cycle.

6. In a sequential type analog to digital converter having a first sample-hold circuit for sampling and holding an analog signal, a comparator having first and second inputs, of which the first input receives an output signal of said sample-hold circuit, a register in which each bit of a digital signal is set sequentially in response to receipt of an ontput signal delivered from said comparator, a digital-to-analog converter for receiving a digital signal set in said register as its input and converting said received signal into an analog signal, and means for sequentially applying an output analog signal of said digital-to-analog converter to the second input of said comparator, said analog-to-digital converter comprising a second sample-hold circuit to which the analog signal of said first sample-hold circuit and the output signal of said digital-to-analog converter are differentially applied at its inputs and for sampling and holding the input signal thus differentially summed; and means for differentially applying to the input of said first sample-hold circuit an output signal of said second sample-hold circuit and an analog signal to be converted, said first and second sample-hold circuits each having a sample-hold period synchronized with one converting cycle during which said input analog signal to be converted is converted into a digital signal.

References Cited

UNITED STATES PATENTS

| | | | |
|---|---|---|---|
| 2,253,976 | 8/1941 | Guanella | 330—9 |
| 3,070,786 | 12/1962 | MacIntyre | 340—347 |
| 3,105,230 | 9/1963 | MacIntyre | 340—347 |
| 3,158,759 | 11/1964 | Jasper | 328—151X |
| 3,184,734 | 5/1965 | Uren et al. | 340—347 |
| 3,265,979 | 8/1966 | Staunton | 330—9 |
| 3,273,035 | 10/1966 | Inderhees | 328—151X |
| 3,308,383 | 3/1967 | Kinoshita et al. | 330—9X |

MAYNARD R. WILBUR, Primary Examiner
G. R. EDWARDS, Assistant Examiner